(12) United States Patent
Molini et al.

(10) Patent No.: US 11,874,811 B2
(45) Date of Patent: Jan. 16, 2024

(54) CONTROL VERSIONING OF TEMPORAL TABLES TO REDUCE DATA REDUNDANCY

(71) Applicants: Stephen Molini, Omaha, NE (US); Bhashyam Ramesh, Secunderabad (IN); Jaiprakash Ganpatrao Chimanchode, PeeranCheruvu Hyderabad (IN); Sai Pavan Kumar Pakala, Hyderabad (IN); Pratik Patodi, Raipur C.G. (IN); Dhrubajyoti Roy, Kolkata (IN); Todd Walter, Mississauga (CA)

(72) Inventors: Stephen Molini, Omaha, NE (US); Bhashyam Ramesh, Secunderabad (IN); Jaiprakash Ganpatrao Chimanchode, PeeranCheruvu Hyderabad (IN); Sai Pavan Kumar Pakala, Hyderabad (IN); Pratik Patodi, Raipur C.G. (IN); Dhrubajyoti Roy, Kolkata (IN); Todd Walter, Mississauga (CA)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 16/235,830

(22) Filed: Dec. 28, 2018

(65) Prior Publication Data
US 2020/0210395 A1    Jul. 2, 2020

(51) Int. Cl.
*G06F 16/21* (2019.01)
*G06F 16/215* (2019.01)

(52) U.S. Cl.
CPC .......... *G06F 16/219* (2019.01); *G06F 16/215* (2019.01)

(58) Field of Classification Search
CPC .... G06F 16/219; G06F 16/215; G06F 16/211; G06F 16/2282
See application file for complete search history.

(56) References Cited

U.S. PATENT DOCUMENTS

| | | | | |
|---|---|---|---|---|
| 6,078,925 A | * | 6/2000 | Anderson | G06F 16/284 |
| | | | | 707/812 |
| 7,028,057 B1 | * | 4/2006 | Vasudevan | G06F 16/219 |
| | | | | 707/999.203 |
| 7,383,285 B1 | * | 6/2008 | Pal | G06F 16/289 |
| 10,671,641 B1 | * | 6/2020 | Holenstein | G06F 16/284 |
| 2005/0131964 A1 | * | 6/2005 | Saxena | G06F 16/219 |
| | | | | 707/999.203 |
| 2007/0050391 A1 | * | 3/2007 | Chatterjee | G06F 16/284 |
| 2007/0094302 A1 | * | 4/2007 | Williamson | G06F 16/289 |
| 2007/0255751 A1 | * | 11/2007 | Bansal | G06F 8/315 |
| 2008/0005077 A1 | * | 1/2008 | Eggebraaten | G06F 16/219 |

(Continued)

*Primary Examiner* — Amy Ng
*Assistant Examiner* — Yohanes D Kelemework
(74) *Attorney, Agent, or Firm* — Gates & Cooper LLP

(57) ABSTRACT

Control versioning of records in a temporal table is provided to reduce data redundancy. New Data Definition Language (DDL) syntax is provided to make individual columns within a table sensitive or insensitive to whether new row versions are generated when Database Manipulation Language (DML) statements operate on the table. The database parser and back-end data processors are configured to create the table with the user-defined versioning attributes and to manage versioning of the rows without requiring additional programming.

17 Claims, 4 Drawing Sheets

(56) References Cited

U.S. PATENT DOCUMENTS

| | | | |
|---|---|---|---|
| 2008/0098045 A1* | 4/2008 | Radhakrishnan | G06F 11/00 707/999.203 |
| 2009/0313309 A1* | 12/2009 | Becker | G06F 16/13 707/999.203 |
| 2010/0030824 A1* | 2/2010 | Shang | G06F 11/2097 707/E17.044 |
| 2010/0185595 A1* | 7/2010 | Gopalakrishnan | G06F 16/219 707/E17.017 |
| 2010/0332526 A1* | 12/2010 | Nori | G06F 16/213 707/769 |
| 2011/0320419 A1* | 12/2011 | Johnston | G06F 16/219 707/703 |
| 2015/0006485 A1* | 1/2015 | Christiansen | G06F 16/273 707/625 |
| 2015/0120687 A1* | 4/2015 | Bhattacharjee | G06F 16/2343 707/704 |
| 2015/0121146 A1* | 4/2015 | Mielenhausen | G06F 16/2329 714/37 |
| 2016/0055197 A1* | 2/2016 | Caro | G06F 16/2365 707/695 |
| 2017/0075975 A1* | 3/2017 | Charron | G06F 16/211 |
| 2018/0357017 A1* | 12/2018 | Karr | G06F 11/3055 |

\* cited by examiner

CONTROL VERSIONING OF TEMPORAL TABLES TO REDUCE DATA REDUNDANCY

BACKGROUND

A temporal database system maintains multiple versions of records for a table so that users can access the state of the database at different points in time. This can result in a lot of unnecessary storage in the database when the many of the changes indicated by the row versions are insignificant to the user. Presently, there is no effective way to control versioning for rows of a table because each row version corresponds to a specific period in time when the row in question had a specific set of column values and the database has no way for identifying when changes in specific column values are significant to track versus insignificant. If certain highly volatile fields in a record have low business value, it can lead to wasteful storage that is costly for an enterprise.

In theory, one might suggest that if certain columns are highly volatile but non-interesting, then one might simply choose to not bring those columns into the data warehouse, but it is rarely clear at first which columns those may be. Also, there may be some value in knowing the actual value of every single source field as of a particular effective date even though one is electing not to version every single change.

Versioning rows of a table can provide a lot of benefits and may even be mandatory for legal reasons, but it may also come with a high cost associated with having wasted storage and unreasonably sized tables, which could impact the performance of the database.

SUMMARY

In various embodiments, methods and a system for control versioning of a temporal table to reduce data redundancy are provided.

In one embodiment, A method to control versioning of a temporal table to reduce data redundancy is provided. A Data Definition Language (DDL) statement is parsed and a version control data construct is defined for one or more columns of the table defined by the DDL statement. Row versioning for the table is managed based on the version control attributes defined for the columns in the table.

DETAILED DESCRIPTION

Figure 1:
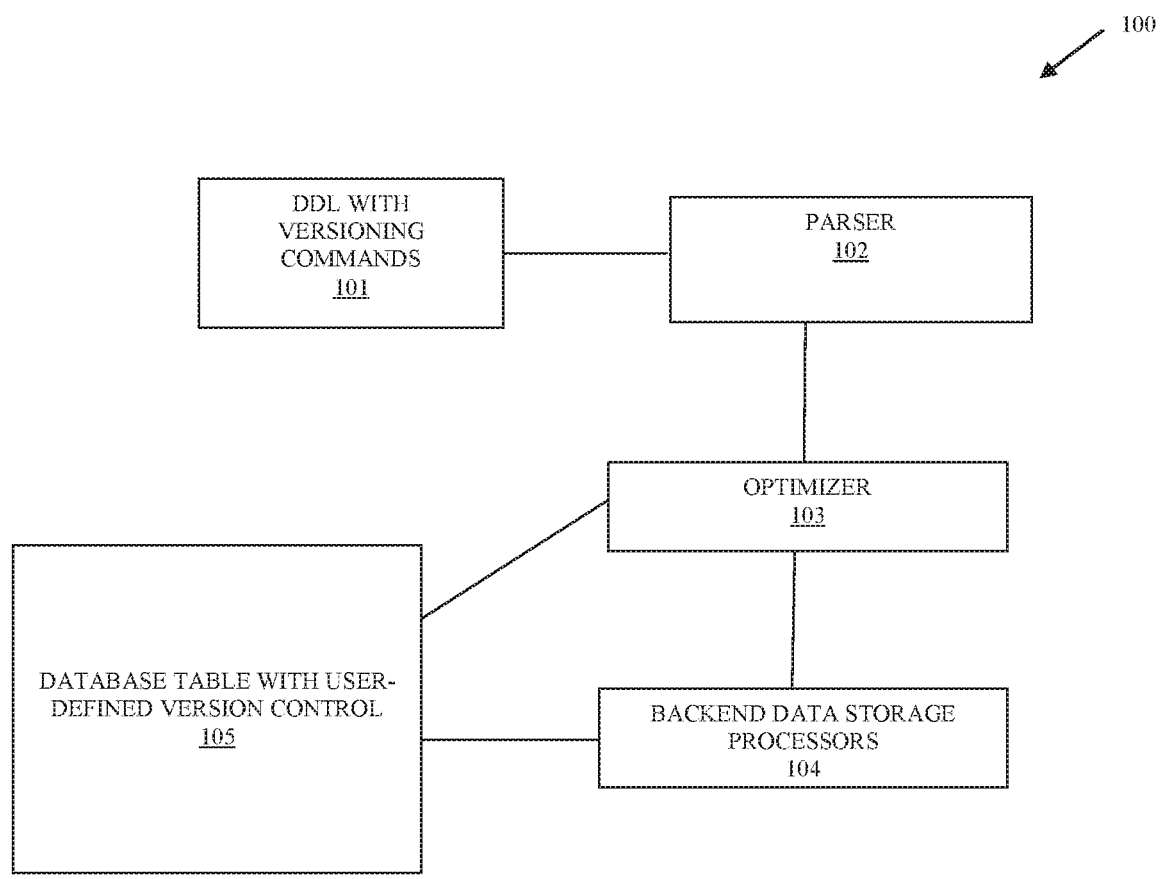
FIG. 1 is a diagram of a system for control versioning of a temporal table to reduce data redundancy, according to an embodiment.

FIG. 1 is a diagram of a system 100 for control versioning of a temporal table to reduce data redundancy. The system 100 is shown in greatly simplified form with just those components necessary for understanding the teachings of control versioning of a temporal table to reduce data redundancy being illustrated. It is to be noted that a variety of other components or less components can be employed without departing for the teachings of control versioning of a temporal table to reduce data redundancy presented herein and below.

The system 100 includes: a Data Definition Language (DDL) statement with versioning control phrases 101, a parser 102, an optimizer 103, a plurality of Back-End Data Storage Processors 104, and a database table with user-defined version control 105 (herein after version-controlled table 105).

As used herein, the terms and phrases "database", "database management system (DBMS)", and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just "warehouse"), The DBMS includes a variety of database tools and operations to manage and provide database services.

The DDL statement 101 can be any language syntax used to describe data structures for the DBMS but for illustration purposes we assume Structured Query Language (SQL) format/syntax.

The user of the database uses DDL statements to identify which columns of the table should suppress row versioning and which should maintain the versioning option.

As will be more completely understood herein and below, the embodiments of the invention provide for changes to the database parser 102, the optimizer 103 and the backend data storage processor(s) 104 of a distributed relational database to support a new DDL constructs recognized as new commands within the DDL statement with versioning commands 101. The new constructs permit the user when defining an initial table of the database to specifically associate columns as being sensitive to versioning or indifferent and that do not need to be versioned by the database. The phrases 1) "VERSION LAST ONLY" and 2) "VERSION FIRST ONLY" in the examples provided herein and below illustrate one embodiment.

Columns tagged with the "VERSION LAST ONLY" phrase will reflect the most recent data value for the column associated with the overall row version. If other columns in the row have changed then a new row version might be created but if this column is the only field that has changed then the existing row version will be updated in place without versioning a new row (thus eliminating storage growth).

Columns tagged with the "VERSION FIRST ONLY" phrase will reflect the first data value for the column associated with the overall row version. If other columns in the row have changed then a new row version might be created but if this column is the only field that has changed then the existing row version and column value remains unchanged.

This provides control to the user and eliminates excessive versioning of table rows, since the user understands which aspects of the user's data is important to version and which aspects are less important to version. The user does not have to implement supplemental programs or special data manipulation language (DML) syntax in order to control row versioning.

The discussions that follow are provided within the above-noted context and examples are provided for purposes of illustration and comprehension only utilizing the above-noted context. It is to be noted, that different syntactical DDL formatted commands can be used from the "VERSION LAST ONLY" and "VERSION FIRST ONLY" constructs, without departing from the teachings provided herein for control versioning of a temporal table to reduce data redundancy.

The validtime column of a temporal table 105 is a period column whose value represents the validity of the entire row and transactiontime column of a temporal table 105 is a period column whose value represents the timestamp when the database became aware of the row.

This means that any change to a single column value requires the versioning of the entire row. But there are many situations where there is little business benefit to generating extra row versions when certain columns change. As used herein, columns that are tracked for changes are referred to as "temporal columns" and to those columns that changes are being suppressed in are referred to as "non-temporal columns."

As an example, consider a data warehouse table 105 where temporal versioning is used to generate an audit trail of record changes that occurred in the operational source system of a record. The Customer table 105 has columns such as First_Name, Last_Name, and Mailing_Address that are important to get row versioning on but also columns such as count fields, pointers, or revision dates that are only relevant to obscure operational processing and is not of interest in the data warehouse environment. In an extreme case, source tables that would nominally have less than 1 million rows can grow to over 1 billion rows of versioned history in the data warehouse environment simply because "uninteresting" changes were made to many records every single day in the operational source system.

The present techniques allow for non-versioned columns along with versioned columns to be managed by the DMBS in a single temporal table 105.

Non-Versioned columns might be controlled with physical data modelling for temporal tables by normalizing temporal tables to separate out the columns which are not dependent on validtime, transactiontime columns.

This creates following issues:
complicated physical data modelling for temporal tables—additional normalization step for temporal tables compared to non-temporal tables; and
query performance impact as multiple tables need to be joined.

The techniques presented herein provide for a new type of "controlled redundancy" in that the non-versioned fields travel along with the temporal record even though they are not entirely dependent upon the validtime or transactiontime dimension keys.

Consider the following example, for using the application in which First_Name and Last_Name of employee is identified as the insignificant column for versioning utilizing the novel database versioning constructs discussed herein. The employee table is created with First_Name and Last_Name as part of a DO NOT VERSION column list with the following DDL statement 101.

```
CREATE TABLE employee (
    Employee_Id VARCHAR (8),
    First_Name VARCHAR (30) VERSION LAST ONLY,
    Last_Name VARCHAR (30) VERSION LAST ONLY,
    Salary INTEGER,
    Location VARCHAR (100),
    Audit_Tag VARCHAR (100) VERSION FIRST ONLY,
    vtcol PERIOD (DATE) AS VALIDTIME NOT NULL
) PRIMARY INDEX (Id);
```

With this table definition, the First_Name, Last_Name and Audit_Tag columns are marked as do not version columns where any temporal UPDATE statement that updates only First_Name, or Last_Name, or Audit_Tag, or any two columns, or all the three columns of the employee table 105 will not version the row but will update the record to the latest value for First_Name and Last_Name columns and the original value of Audit_Tag column. Let following be an entry in the employee table.

| Employee_Id | First_Name | Last_Name | Salary | Location | Audit_Tag | Vtcol |
|---|---|---|---|---|---|---|
| PP186050 | Pratik | Patodi | 10000 | Hyderabad | Ok 2016-05-11 | (2016-05-12, UNTIL_CHANGED) |

If the below noted UPDATE query is performed on the above-mentioned employee table 105 at a current time of 'T100' then no versioning is performed and the row is represented as:

UPDATE employee SET Last_Name='Jain' WHERE Id='PP186050';

| Employee_Id | First_Name | Last_Name | Salary | Location | Audit_Tag | Vtcol |
|---|---|---|---|---|---|---|
| PP186050 | Pratik | Jain | 10000 | Hyderabad | Ok 2016-05-11 | (2016-05-12, UNTIL_CHANGED) |

Alternatively, consider a stage table called stgEmployee holding a record where all column values are the same as what is shown in the Employee target table 105 except that the Audit_Tag field is different. Then a MERGE INTO statement such as the following would not change anything in the target table 105 because the Audit_Tag column has been marked as VERSION FIRST ONLY,

```
MERGE INTO employee AS tgt USING stgEmployee AS src
ON src.employee_id = tgt.employee_id
WHEN MATCHED THEN UPDATE
SET first_name=SRC.first_name, last_name=
SRC.last_name, salary= SRC.salary, location= SRC.location,
audit_tag= SRC.audit_tag
WHEN NOT MATCHED THEN INSERT VALUES
```

```
(employee_id, first_name, last_name, salary, location,
    audit_tag);
```

If the stage table row had a different value for both Last_Name and Audit_Tag but no other changes, then target row in the Employee table 105 would have Last_Name updated but not the Audit_Tag field and otherwise no new row version is generated.

| Employee_Id | First_Name | Last_Name | Salary | Location | Audit_Tag | Vtcol |
|---|---|---|---|---|---|---|
| PP186050 | Pratik | Jain | 10000 | Hyderabad | Ok 2016-05-11 | (2016-05-12, UNTIL_CHANGED) |

Additionally, if the stage table row updated the Salary field or if the Employee_Id key did not exist in the target table 105, then new row versions will be generated and the latest value of Last_Name and Audit_Tag on the stage table record will be reflected on the new version. The resulting temporal records might look like the following.

| Employee_Id | First_Name | Last-Name | Salary | Location | Audit_Tag | Vtcol |
|---|---|---|---|---|---|---|
| PP186050 | Pratik | Patodi | 10000 | Hyderabad | Ok 2016-05-11 | (2016-05-12, 2017-03-01) |
| PP186050 | Pratik | Jain | 12000 | Hyderabad | Ok 2017-03-01 | (2017-03-01, UNTIL_CHANGED) |
| RB121990 | Ramesh | Bhashyam | 30000 | Pune | Ok 2017-02-20 | (2017-03-01, UNTIL_CHANGED) |

The parser 102 is configured to recognize from the DDL statement 101 the new data constructs (VERSION FIRST ONLY and VERSION LAST ONLY). The optimizer 103 is configured to set the column attributes as noted above on the table 105 when creating a table associated with the DDL statement 101 and the Back-End Data Processor(s) 104 are configured to perform the versioning on the table 105 in the manners discussed above.

These and other embodiments will now be discussed with reference to the FIGS. 2-4.

Figure 2:
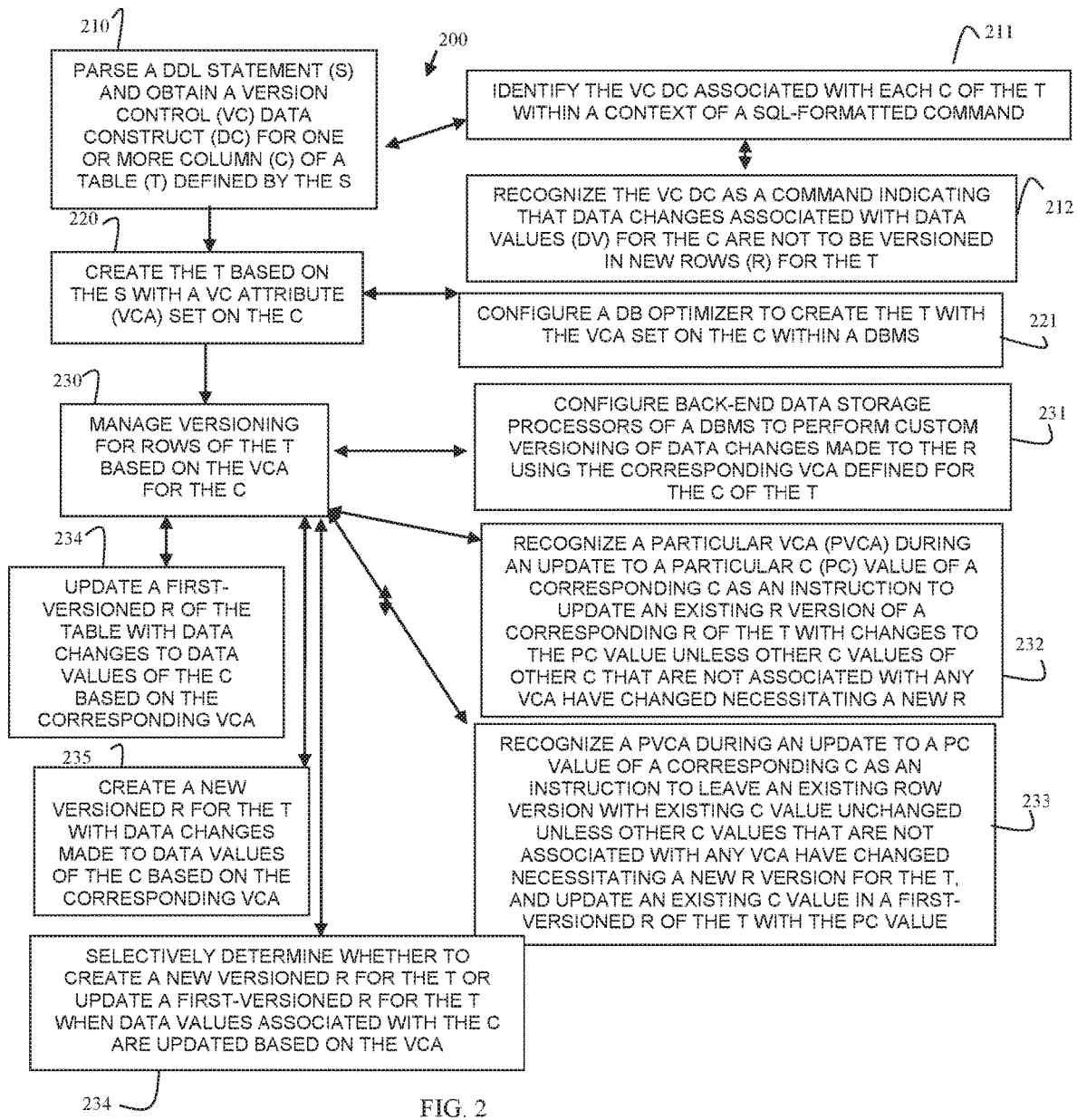
FIG. 2 is a diagram of a method for control versioning of a temporal table to reduce data redundancy, according to an example embodiment.

FIG. 2 is a diagram of a method 200 for control versioning of a temporal table to reduce data redundancy, according to an example embodiment. The method 200 is implemented as one or more software modules referred to as a "table row version controller"). The table row version controller represents executable instructions that are programmed within memory or a non-transitory computer-readable medium and executed by one or more hardware processors of one or more devices. The table row version controller may have access to one or more network connections during processing, which can be wired, wireless, or a combination of wired and wireless.

In an embodiment, the table row version controller executes on devices of a data warehouse across one or more physical devices or nodes (computing devices) for execution over one or more network connections.

In an embodiment, the table row version controller is all or of or any combination of: parser 102, the optimizer 103, and the Back-End Data Storage Processor(s) 104.

The table row version controller processes DDL statements 101 that define the creation of a table utilizing new user-defined version control data construct(s) for columns in the table.

At 210, the table row version controller parses a DDL statement and obtains a version control data construct for one or more columns of a table being defined by the DDL statement. In an embodiment, the table row version controller uses the parser 102 to obtain the version control data construct.

In an embodiment, at 211, the table row version controller identifies the version control data construct with each column of the table within a context of a SQL-formatted command.

In an embodiment of 211 and at 212, the table row version controller recognizes the version control data construct as a command indicating that data changes associated with data values for the column are not to be versioned in new rows for the table.

In an embodiment, the SQL-formatted command is one of: VERSION FIRST ONLY and VERSION LAST ONLY as discussed above.

At 220, the table row version controller creates the table based on the DDL statement with the version control attribute set on the column.

In an embodiment, at 221, the table row version controller configures a database optimizer (such as optimizer 103) to create the table with the version control attribute set on the column within a DBMS.

At 230, the table row version controller manages versioning for rows of the table based on the version control attribute for the column.

In an embodiment of 221 and 230, at 231, the table row version controller configures back-end data storage processors of a DBMS (such as 104) to perform customized versioning for data changes made to the rows using the corresponding version control attribute for the column of the table.

In an embodiment, at 232, the table row version controller recognizes a particular version control attribute during an update to a particular column value of a corresponding column as an instruction to update an existing row version of a corresponding row of the table with changes to the particular column value unless other column values of other columns that are not associated with any version control attributes have changed necessitating a new versioned row.

In an embodiment, at 233, the table row version controller recognizes a particular version control attribute during an update to a particular column value of a corresponding column as an instruction to leave an existing row version with existing column value unchanged unless other column values that are not associated with any version control attributes have changed necessitating a new row version for the table. The table row version controller also then updates an existing column value in a first-versioned row of the table with the particular column value.

In an embodiment, at 234, the table row version controller updates a first-versioned row of the table with data changes made to data values of the column based on the corresponding version control attribute for the column.

In an embodiment, at 235, the table row version controller creates a new versioned row for the table with data changes made to data values of the column based on the version control attribute.

Figure 3:
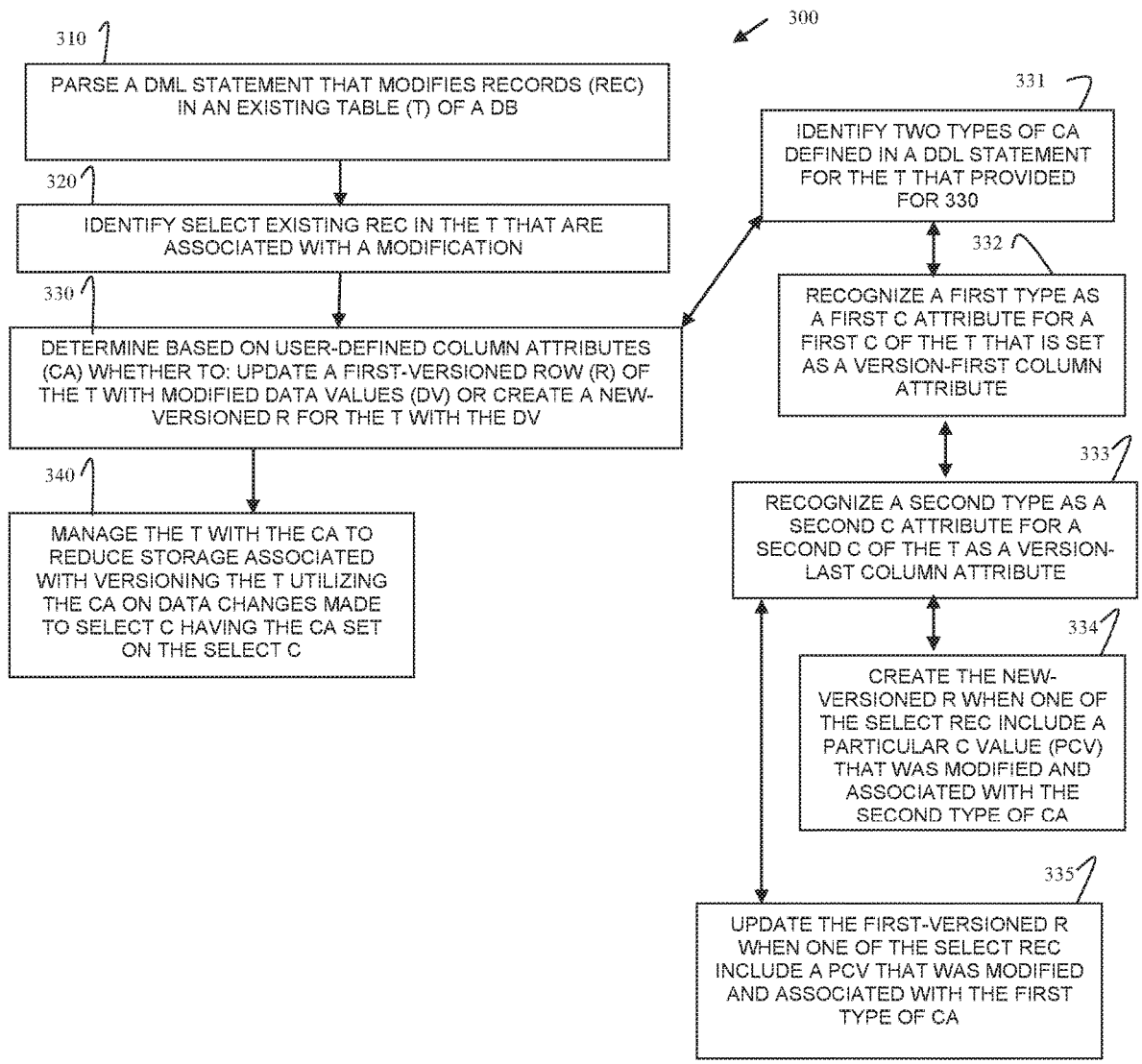
FIG. 3 is a diagram of another method for control versioning of a temporal table to reduce data redundancy, according to an example embodiment.

In an embodiment, at 236, the table row version controller selectively determines whether to create a new versioned row for the table or whether to update a first-versioned row of the table when data values associated with the column are updated based on the version control attribute, FIG. 3 is a diagram of another method 300 for control versioning of a temporal table to reduce data redundancy, according to an embodiment. The method 300 is implemented as one or more software modules referred to as a "table versioning manager," The table versioning manager represents executable instructions that are programmed within memory or a non-transitory computer-readable medium and executed by one or more hardware processors of a device. The table versioning manager may have access to one or more network connections during processing, which can be wired, wireless, or a combination of wired and wireless.

The processing depicted for the table versioning manager in the FIG. 3 presents another and, in some ways, enhanced perspective of the processing discussed above with the FIGS. 1 and 2.

In an embodiment, the table versioning manager is all of or any combination of: the parser 102, the optimizer 103, the AMPs 104, and/or the method 200.

At 310, the table versioning manager parses a DML statement that modified records in an existing table of a database.

At 320, the table versioning manager identifies select existing records in the table that are associated with a modification.

At 330, the table versioning manager determines based on user-defined column attributes whether to: 1) update a first-versioned row of the table with modified data values or 2) create a new-versioned row for the table with the data values.

In an embodiment, at 331, the table versioning manager identifies two types of user-defined column attributes defined in a ©DL statement for the table. The types are used to determine whether to process 1) or 2) at 330.

In an embodiment of 331 and at 332, the table versioning manager recognizes a first type as a first column attribute for a first column of the table that is set as a version-first column attribute.

In an embodiment of 332 and at 333, the table versioning manager recognizes a second type as a second column attribute for a second column of the table as a version-last column attribute.

In an embodiment of 333 and at 334, the table versioning manager creates a new-versioned row when one of the select existing records include a particular column value that was modified and associated with the second type of user-defined column attributes.

In an embodiment of 333 and at 335, the table versioning manager updates the first-versioned row when one of the select existing records include a particular column value that was modified and associated with the first type of user-defined column attributes.

In an embodiment, at 340, the table versioning manager manages the table with the user-defined column attributes to reduce storage associated with versioning the table utilizing the user-defined column attributes on data changes made to select columns having the user-defined column attribute set on the select columns.

Figure 4:
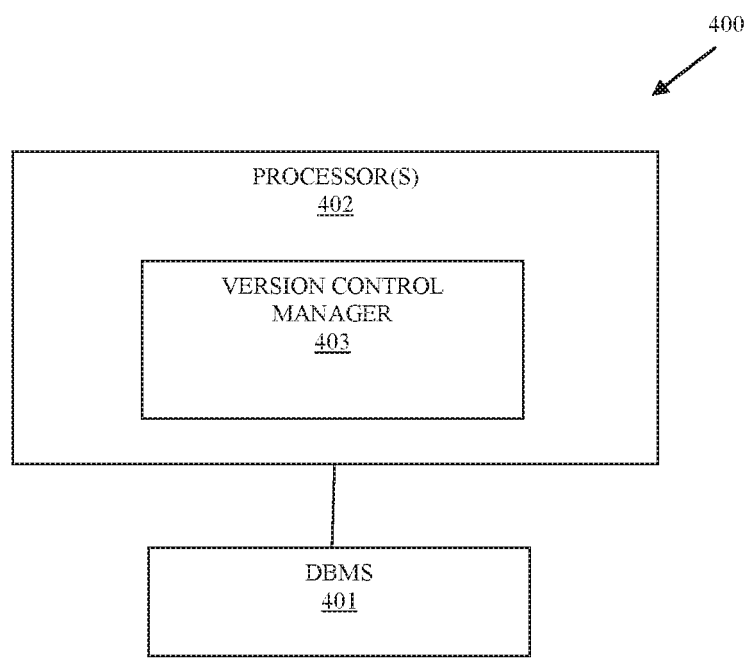
FIG. 4 is a diagram of a system for control versioning of a temporal table to reduce data redundancy, according to an example embodiment.

FIG. 4 is a diagram of a system 400 for control versioning of a temporal table to reduce data redundancy, according to an example embodiment. The system 400 includes a variety of hardware components and software components. The software components are programmed as executable instructions into memory and/or a non-transitory computer-readable medium for execution on the hardware components (hardware processors). The system 400 includes one or more network connections; the networks can be wired, wireless, or a combination of wired and wireless.

The system 400 implements, inter alia, the processing discussed above with the FIGS. 1-3.

The system 400 includes: a DBMS 401, at least one hardware processor 402 and a non-transitory computer-readable storage medium having executable instructions representing a version control manager 403.

The version control manager 403 when executed on the at least one hardware processor 402 from the non-transitory computer-readable storage medium performs processing to: create a table with version-specific attributes set on select columns of the table; and process updates to the select columns by either creating new versioned row in the table or updating a first versioned row in the table based on the version-specific attributes.

In an embodiment, the version-specific attributes include a do not version attribute and an always version attribute, the do not version attribute causing the version control manager 403 to process the updates by updating the first versioned row, and the always version attribute causing the version control manager 403 to process the updated by creating the new versioned rows.

In an embodiment, the versioning manager 403 is all or some combination of: the parser 102, the optimizer 104, the AMPs 105, the method 200, and/or the method 300.

In an embodiment, the versioning control manager 403 executes on a massively parallel backend data storage processor.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   parsing a Data Definition Language (DDL) statement to obtain a version control data construct for one or more columns of a table defined by the DDL statement, wherein the parsing further includes recognizing the version control data construct as a command indicating whether data changes associated with data values for the one or more columns of the table are not to be versioned;
   creating the table based on the DDL statement with a version control attribute set on the one or more columns that reflects the version control data construct; and managing versioning for rows of the table based on the version control attribute for the one or more columns of the table, by:
creating a new row version when the data changes are associated with the data values of the one or more columns of the table that are to be versioned, and
selectively updating an existing row version without creating the new row version when the data changes are associated with the data values for the one or more columns of the table that are not to be versioned, wherein:
when the version control attribute represents "VERSION LAST ONLY", then the data changes associated with the data values for the one or more columns of the table that are not to be versioned update the existing row version of the table; and
when the version control attribute represents "VERSION FIRST ONLY", then the data changes associated with the data values for the one or more columns of the table that are not to be versioned do not update the existing row version of the table.

2. The method of claim 1, wherein parsing further includes identifying the version control data construct associated with the one or more columns of the table in a context of a Structured Query Language (SQL)-formatted command.

3. The method of claim 1, wherein creating further includes configuring a database optimizer to create the table with the version control attribute set on the one or more columns within a Database Management System (DBMS).

4. The method of claim 1, wherein managing further includes configuring Back-End Data Storage Processor(s) of a Database Management System (DBMS) to perform customized versioning of the data changes made to one or more rows of the table using the version control attribute defined for the one or more columns of the table.

5. The method of claim 1, wherein managing further includes recognizing when the data values of the one or more columns of the table that are to be versioned have changed necessitating the new row version be created for the table.

6. The method of claim 1, wherein managing further includes recognizing when the data values of the one or more columns of the table that are to be versioned have changed necessitating the new row version be created for the table, and then updating the existing row version of the table with the data changes associated with the data values for the one or more columns of the table that are not to be versioned.

7. The method of claim 1, wherein managing further includes creating the new row version for the table with the data changes made to the data values of the one or more columns of the table that are to be versioned.

8. A method, comprising:
parsing a Data Manipulation Language (DML) statement that modifies an existing table in the database by applying data values to one or more columns of the existing table;
identifying one or more rows in the existing table that are associated with the data values to be applied to the one or more columns; and
determining, based on user-defined column attributes for the one or more columns in the existing table, whether to:
create new versions of the rows of the existing table when the data values of the one or more columns of the existing table are versioned, and
selectively update existing versions of the rows of the existing table without creating the new versions of the rows when the data values for the one or more columns of the existing table are not versioned, wherein the selectively update operates to:
1) when the user-defined column attributes represent "VERSION LAST ONLY," then update the existing versions of the rows of the existing table with the data values to be applied to the one or more columns without creating the new versions of the rows, or
2) when the user-defined column attributes represent "VERSION FIRST ONLY," then not update the existing versions of the rows of the existing table with the data values to be applied to the one or more columns without creating the new versions of the rows,
wherein the user-defined column attributes indicate that data changes associated with the data values for the one or more columns are not versioned in the existing table.

9. The method of claim 8, wherein determining further includes identifying two types of the user-defined column attributes defined in a Data Definition Language (DDL) statement for the existing table that provide for the determining.

10. The method of claim 9, wherein identifying further includes recognizing a first type as a first column attribute for a first column of the existing table set as a version-first column attribute.

11. The method of claim 10, wherein identifying further includes recognizing a second type as a second column attribute for a second column of the existing table as a version-last column attribute.

12. The method of claim 11, wherein determining further includes creating the new versions of the rows when the rows include a particular column that was modified and the particular column was not associated with the second type of the user-defined column attributes.

13. The method of claim 10, wherein determining further includes creating the new versions of the rows when the rows include a particular column that was modified and the particular column was not associated with the first type of the user-defined column attributes.

14. The method of claim 8 further comprising, managing the existing table with the user-defined column attributes to reduce storage associated with versioning the existing table utilizing the user-defined column attributes on data changes made to select columns having the user-defined column attributes set on the select columns.

15. A system, comprising:
a database management system;
at least one hardware processor;
a non-transitory computer-readable storage medium having executable instructions representing a version control manager;
the version control manager configured to execute on the at least one hardware processor from the non-transitory computer-readable storage medium and to perform processing to:
create a table with version-specific attributes defined on one or more columns of the table, wherein the version-specific attributes indicate whether data changes associated with data values for the one or more columns of the table are not to be versioned in new versions of rows in the table; and
process updates to the one or more columns of the table by either (1) creating the new versions of the rows in the table when the data changes are associated with the data values for the one or more columns of the table are to be versioned, or (2) updating existing versions of the rows in the table based on the version-specific attributes when the data changes are associated with the data values for the one or more columns of the table are not to be versioned in the new versions of the rows in the table, wherein:

when the version-specific attributes represent "VERSION LAST ONLY", then the data changes associated with the data values for the one or more columns of the table that are not to be versioned update the existing versions of the rows in the table; and when the version-specific attributes represent "VERSION FIRST ONLY", then the data changes associated with the data values for the one or more columns of the table that are not to be versioned do not update the existing versions of the rows in the table.

16. The system of claim 15, wherein the version-specific attributes include a do not version attribute and an always version attribute, the do not version attribute causing the version control manager to process the updates by updating the existing versions of the rows in the table, and the always version attribute causing the version control manager to process the updates by creating the new versions of the rows in the table.

17. The system of claim 15, wherein the version control manager executes on a massively parallel backend data storage processor.

* * * * *